US012616174B1

(12) United States Patent
Meng

(10) Patent No.: US 12,616,174 B1
(45) Date of Patent: May 5, 2026

(54) AUTOMATIC EGG TURNING DEVICE FOR INCUBATOR

(71) Applicant: Junhua Meng, Dezhou (CN)

(72) Inventor: Junhua Meng, Dezhou (CN)

( * ) Notice: Subject to any disclaimer, the term of this patent is extended or adjusted under 35 U.S.C. 154(b) by 0 days.

(21) Appl. No.: 18/951,312

(22) Filed: Nov. 18, 2024

(30) Foreign Application Priority Data

Nov. 4, 2024    (CN) .......................... 202422674386.6

(51) Int. Cl.
A01K 41/06          (2006.01)
(52) U.S. Cl.
CPC .................................. A01K 41/065 (2013.01)
(58) Field of Classification Search
CPC .............................. A01K 41/06; A01K 41/065
See application file for complete search history.

(56) References Cited

U.S. PATENT DOCUMENTS 1,254,273 A * 1/1918 Pope ...................... A01K 41/06
                                                            119/323
1,270,931 A * 7/1918 Dudley et al. ......... A01K 41/06
                                                            119/327

1,417,550 A * 5/1922 Morse .................... A01K 41/06
                                                            119/327
3,669,075 A * 6/1972 Marsh .................... A01K 41/06
                                                            119/323
3,783,833 A * 1/1974 Bailey ................... A01K 41/06
                                                            119/319
4,603,772 A * 8/1986 Tomosue ............... B65G 69/16
                                                            198/534
11,819,009 B1 * 11/2023 Wang .................... A01K 41/06

FOREIGN PATENT DOCUMENTS

GB          2093328 A  *  9/1982  ............. A01K 41/06
KR     20130011100 A  *  1/2013  ........... A01K 41/065

* cited by examiner

*Primary Examiner* — Monica L Perry

(57)          ABSTRACT

An automatic egg turning device for incubator, includes a base and a turning assembly arranged in the base, wherein the turning assembly comprises an egg tray, a linkage bracket and a driving component; the egg tray is used for accommodating a plurality of eggs and is connected to the linkage bracket; the driving component is used to drive the linkage bracket to move, and the linkage bracket drives the egg tray to move in the base. This automatic egg turning device enables automatic egg turning, improving the egg hatching rate.

9 Claims, 8 Drawing Sheets

AUTOMATIC EGG TURNING DEVICE FOR INCUBATOR

CROSS-REFERENCE TO RELATED APPLICATIONS

The present application claims the benefit of Chinese Patent Application No. 202422674386.6 filed on Nov. 4, 2024, the contents of which are hereby incorporated by reference.

TECHNICAL FIELD

The invention belongs to the technical field of egg incubator, and particularly relates to an automatic egg turning device for incubator.

TECHNICAL BACKGROUND

Nowadays, producers often use an incubator to assist in the incubation of eggs in order to improve the success rate of incubation of eggs. The incubator has the function of controlling temperature and humidity, which is helpful for embryonic development. However, one must turn eggs during a hatching process so as to ensure a high success rate of incubation. If the eggs are not turned over for a long time, the embryonic development will be hindered, the success rate of incubation will be declined greatly.

At present, when producers use the egg incubators, they have to manually turn over eggs during the hatching process. Such kind of eggs turning jobs not only time waste but also a high labor cost. Besides, frequent manual intervention may increase the risk of pollution, especially in the case of loose control of sanitary conditions, which may lead to a low success rate of incubation.

Therefore, there is an urgent need to provide an incubator with an automatic egg turning function.

CONTENT OF THE INVENTION

In order to overcome the defects of the existing technology, the invention provides an automatic egg turning device for incubator, which has a function of turning eggs automatically during a hatching process, in this way, it not only saves times and labor cost, but also ensures a high success rate of incubation.

The technical scheme adopted by the invention for solving the technical problems is as follows:

An automatic egg turning device for incubator, comprises a base and a turning assembly arranged in the base; the turning assembly comprises an egg tray, a linkage bracket and a driving component; the egg tray is used to accommodate eggs; the egg tray is connected to the linkage bracket; the driving component is used to drive the linkage bracket to move; and the linkage bracket drives the egg tray to move.

Preferably, the driving component comprises a motor and an eccentric cam, wherein the eccentric cam is connected with an output end of the motor; the linkage bracket comprises a sliding rod extending towards a vertical direction; the sliding rod is provided with a sliding groove extending towards the vertical direction, one end of the eccentric cam far away from the motor is provided with a plurality of connecting rods; and the plurality of connecting rods are limited moving along the sliding groove.

Preferably, the linkage bracket further comprises a connecting component and a first support rod, wherein the first support rod extends in a horizontal direction; and the first support rod is connected with the sliding rod through the connecting component.

Preferably, an end of the base is provided with a mounting rack, wherein the a top of the mounting rack is provided with a pressing block; and the pressing block covers the first support rod.

Preferably, a plurality of second clamping grooves are uniformly distributed on the first support rod at intervals, wherein an end part of the egg tray is provided with a first clamping block matched with one of the plurality of second clamping grooves; and multiple egg trays are provided and the number is the same as that of the plurality of second clamping grooves.

Preferably, two ends of the base are provided with a plurality of second support rods, wherein a top of each of the plurality of second support rods are provided with a third clamping grooves; and two ends of the egg tray are respectively provided with a second clamping blocks matched with the third clamping grooves.

Preferably, a bottom of the base is provided with a convex platform, wherein the a middle of the convex platform is provided with a concave part, one side of the convex platform is provided with a notch; the base is provided with a water inlet groove extending to an outside of the base; and the water inlet groove is communicated with the concave part through the notch.

Preferably, the automatic egg turning device for incubator further comprises a support disk, wherein the support disk is of a mesh structure; and the support disk is arranged on the convex platform.

Preferably, the end of the base is provided with a motor mounting groove, wherein a motor fixing seat is arranged in the motor mounting groove; and the motor is installed on the motor fixing seat.

Preferably, the base is provided with a wire pressing structure, wherein the wire pressing structure comprises a first wire pressing structure and a second wire pressing structure which are arranged on an outer surface of the base.

The beneficial effects of the present invention:

The invention provides an automatic egg turning device for incubator, which has a function of turning eggs automatically; the automatic egg turning device for incubator comprises a driving component and a linkage bracket; the driving component drives the linkage bracket to move horizontally so as to have egg trays to move accordingly, then eggs in the eggs tray moves. The eggs are turned over during movements of the egg trays. The automatic egg turning device for incubator helps producers have eggs turning automatically, thereby saving times and labor cost and ensuring a high success rate of incubation.

1. Base; 10. Motor mounting groove; 11. Second support rod; 111. Third clamping groove;

12. Mounting rack 121. Pressing block; 13. convex platform; 131. Concave part; 132. Notch; 14. Water inlet groove; 15. Support disk; 16. Support column; 161. First clamping groove;

20. Egg tray; 200. Through hole; 201. First clamping block; 202. Second clamping block;

21. Linkage bracket; 211. Sliding rod; 2111. Sliding groove; 212. Connecting component; 213. First support rod; 2131. Second clamping groove;

22. Driving component; 220. Motor fixing seat; 221. Motor; 222. Wire pressing structure; 2221. First wire pressing structure; 2222. Second wire pressing structure; 223. Eccentric cam; 224. Connecting rod.

SPECIFIC EMBODIMENT

Below is a further detailed description of the present application in combination with the figures.

These embodiments only show an explanation of the present application and it is not a limitation to the present application. The skilled in the art can make modifications to this embodiment as needed without making any creative contributions after reading this specification, which are always protected by the patent law as long as they are within the scope of the claims of the present application.

It should be noted that when an element is called as being "fixed to" or "arranged on" another element, it can be directly on another element or indirectly on another element. When an element is called as being "connected to" another element, it can be directly connected to another element or indirectly connected to another element.

It should be understood that the terms "length", "width", "upper", "lower", "front", "rear", "left", "right", "vertical", "horizontal", "top", "bottom", "inside" and "outside" which indicates the orientations or positional relationships are based on the orientations or positional relationships shown in the figures. They are only for facilitating describing the present application and simplifying the description, rather than indicating or implying that the device or element must have a specific orientation, construct and operate in a specific orientation. Therefore, it cannot be understood as a limitation of the present application.

In addition, the terms "first" and "second" are used for descriptive purposes only and cannot be understood as indicating or implying relative importance or implicitly indicating the quantity of indicated technical features. Therefore, a feature defined with "first" and "second" may explicitly or implicitly include one or more of these features. In the description of the present application, "a plurality of" means two or more, unless otherwise specifically defined.

The invention provides an automatic egg turning device for incubator, which can automatically turn eggs, so as to save labor cost and time cost, and ensure a high success rate of incubation.

Figure 1:
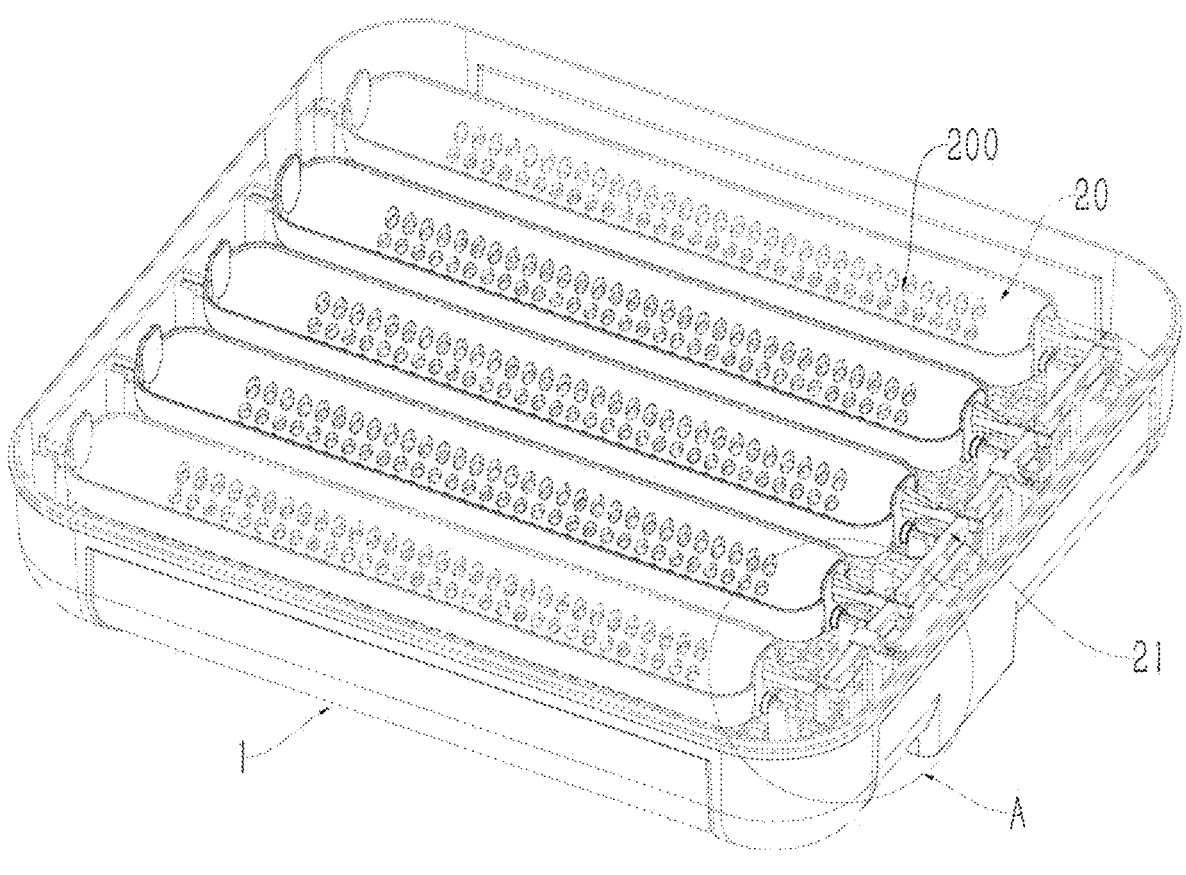
FIG. 1 is an overall schematic view of an automatic egg turning device for incubator of the present invention.
Figure 2:
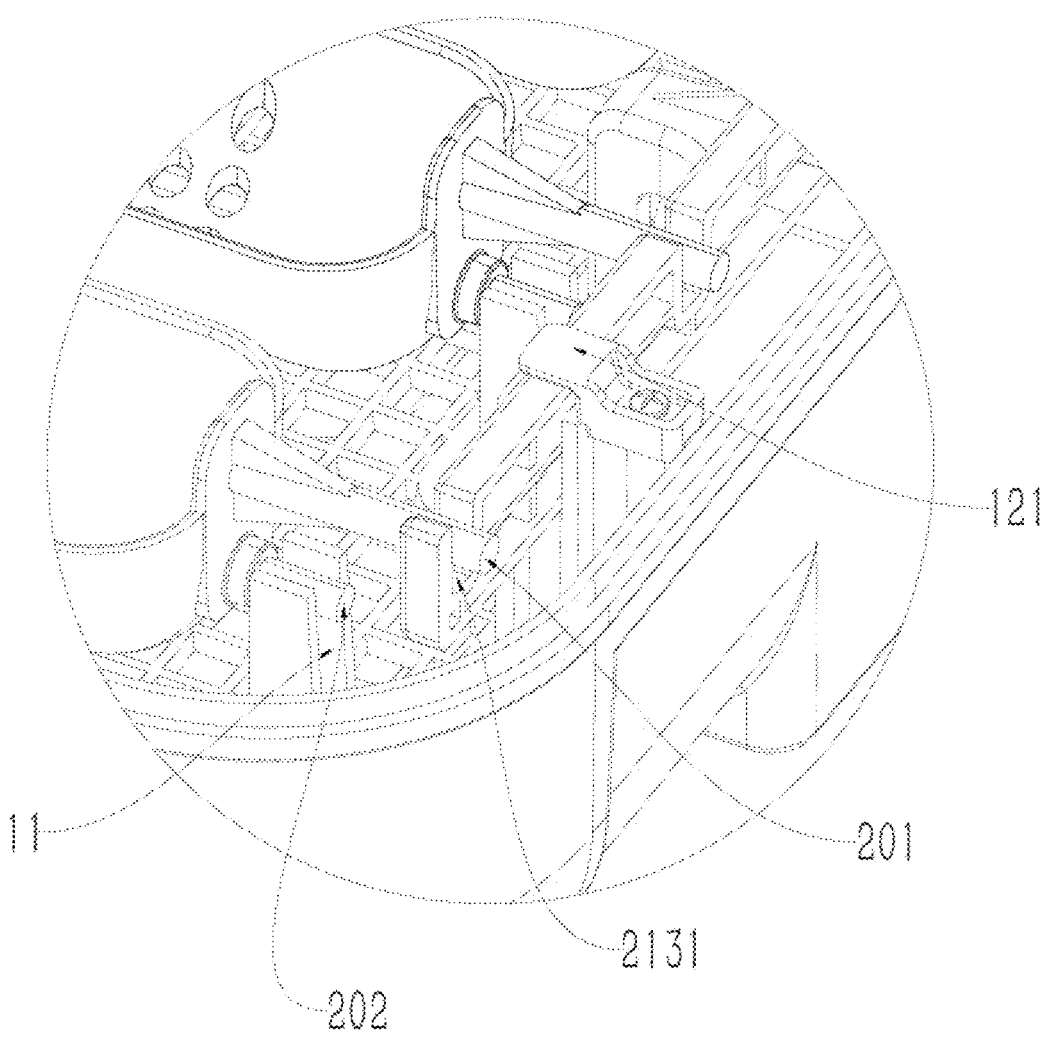
FIG. 2 is an enlarged schematic view of the portion A in FIG. 1.
Figure 3:
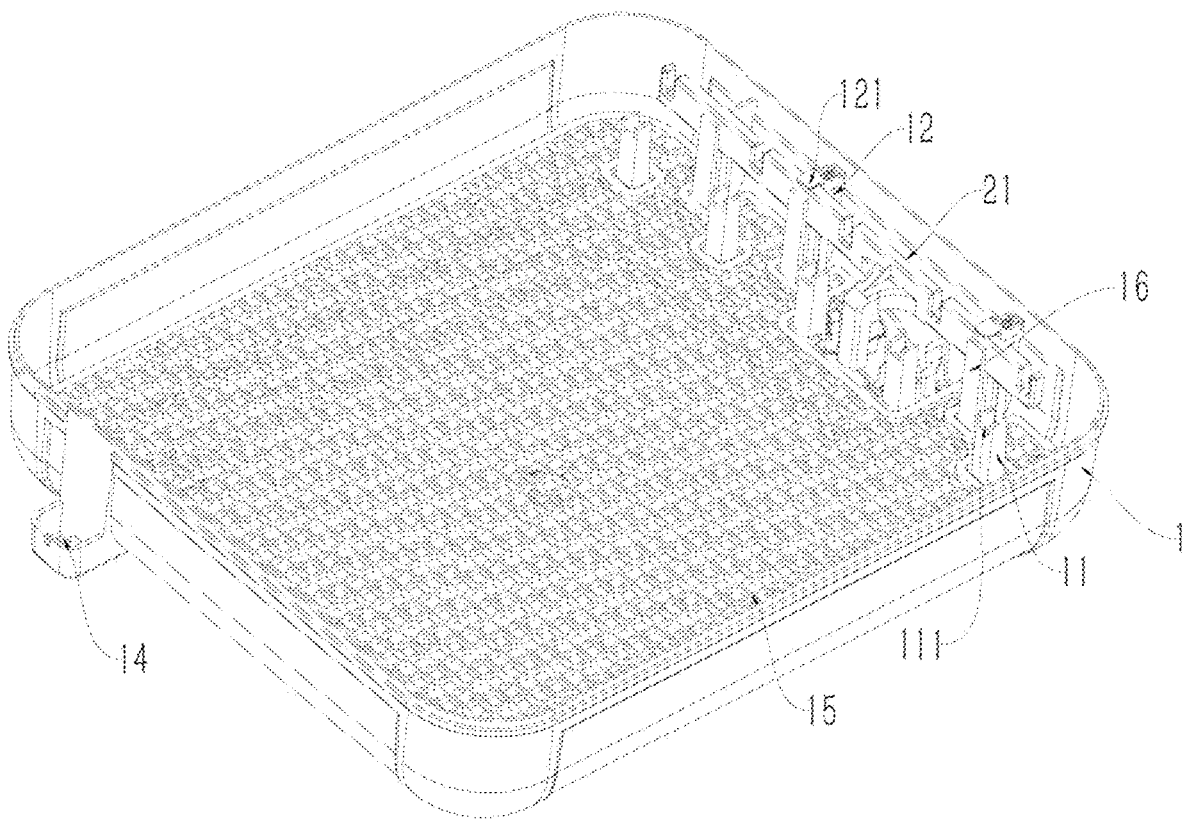
FIG. 3 is a schematic view of the automatic egg turning device for incubator with the egg tray removed.
Figure 4:
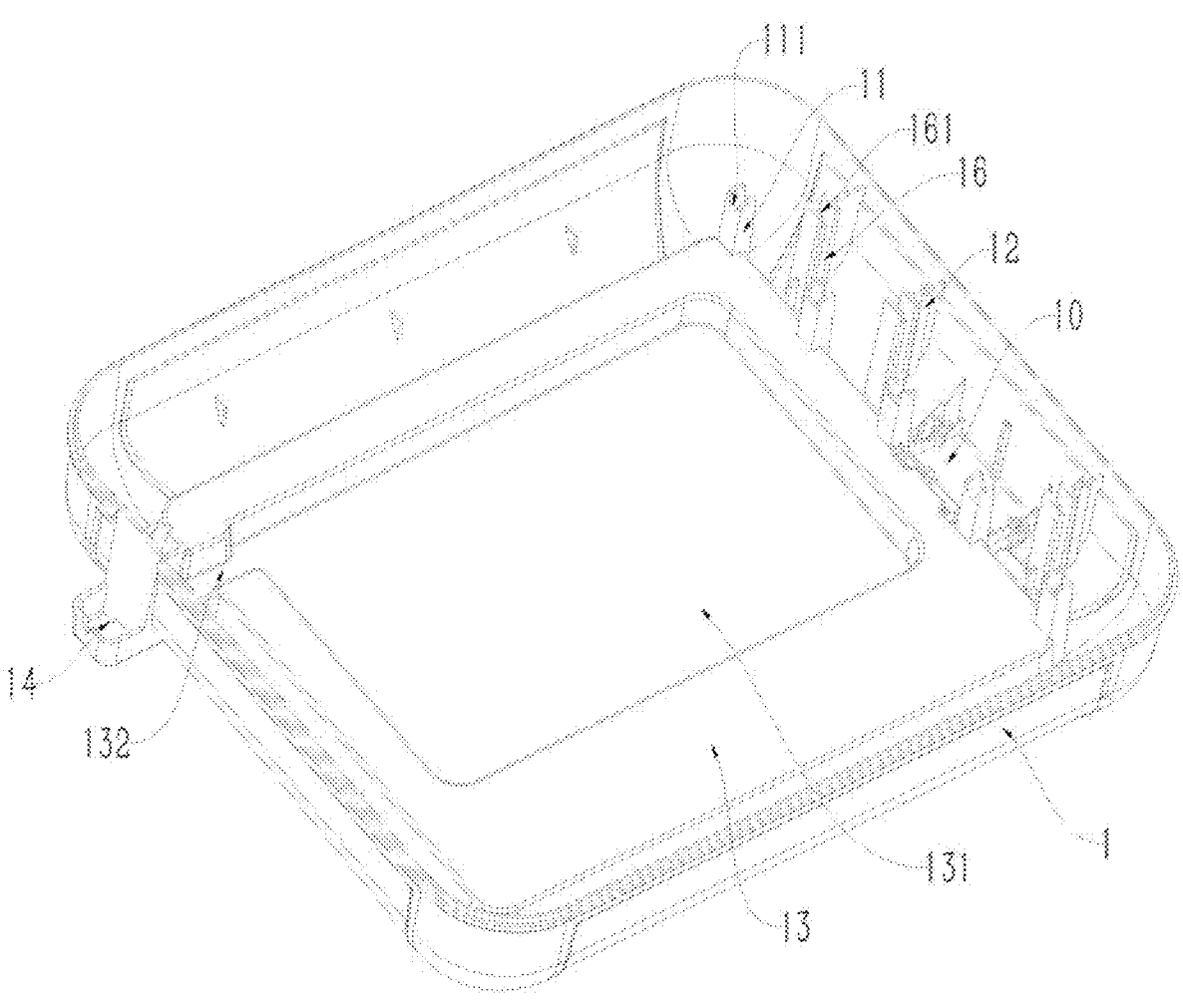
FIG. 4 is a schematic view of the base of an automatic egg turning device for incubator.
Figure 5:
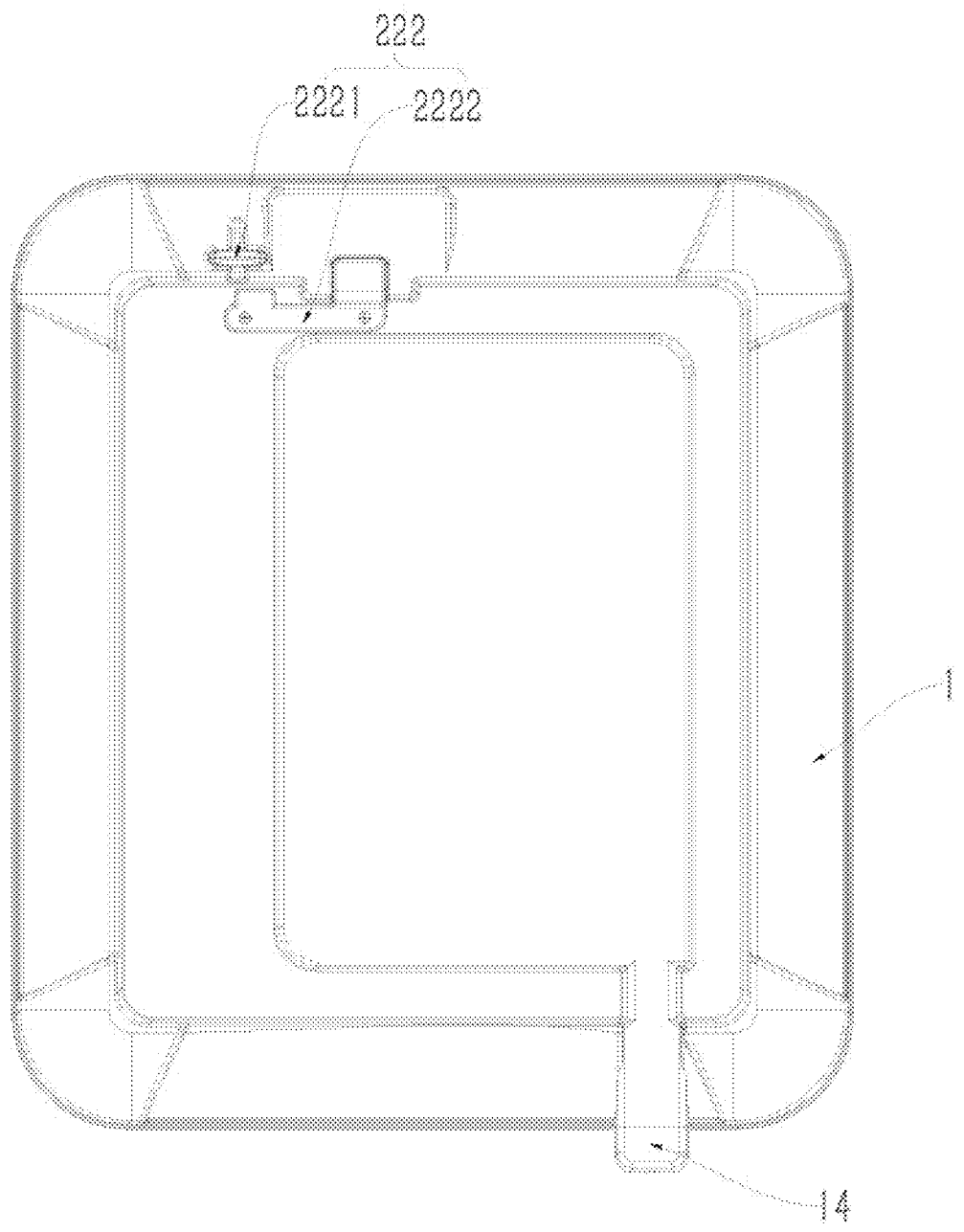
FIG. 5 is another perspective schematic view of a base of an automatic egg turning device for incubator.
Figure 6:
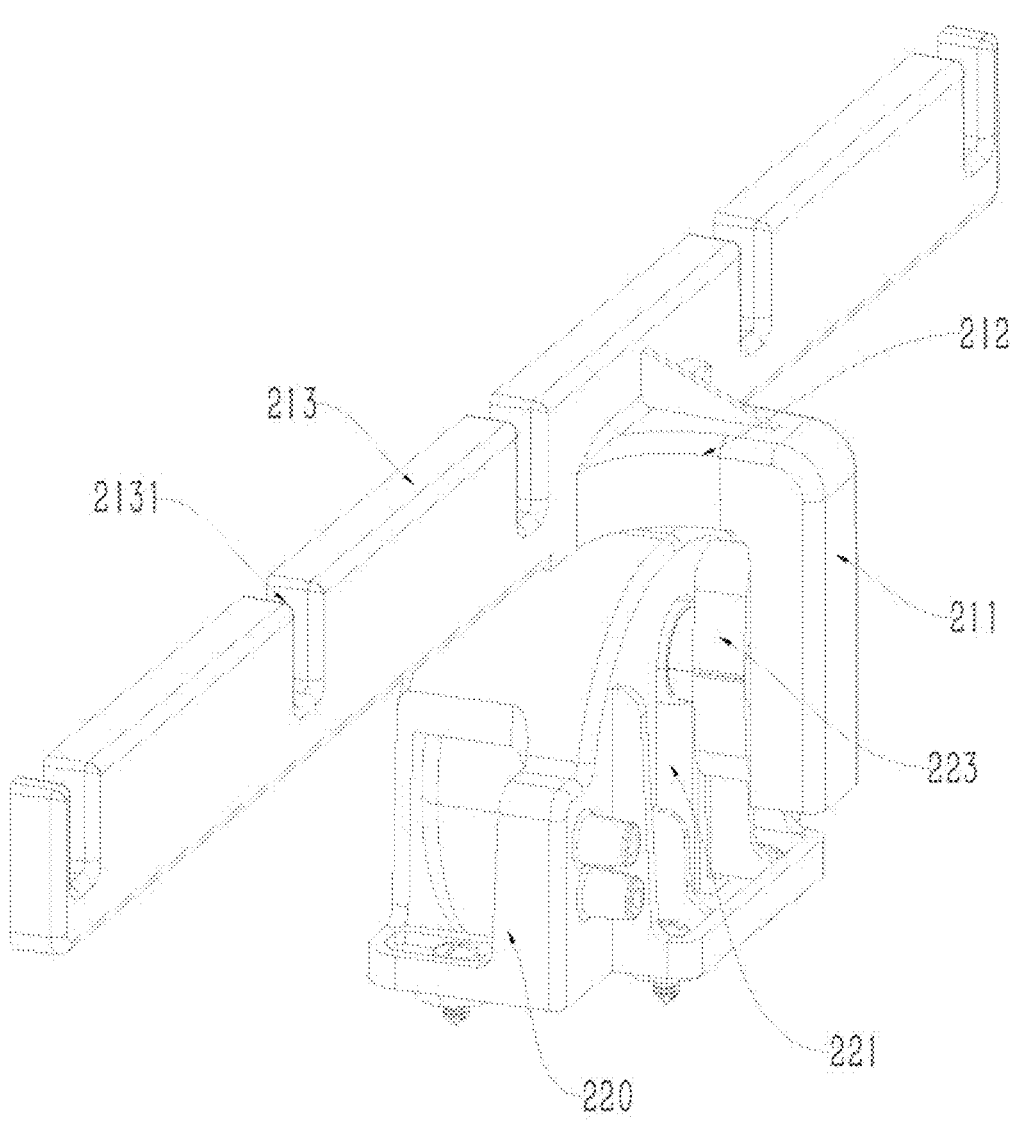
FIG. 6 is a schematic view of the cooperation of a linkage bracket and a driving component in an automatic egg turning device for incubator.
Figure 7:
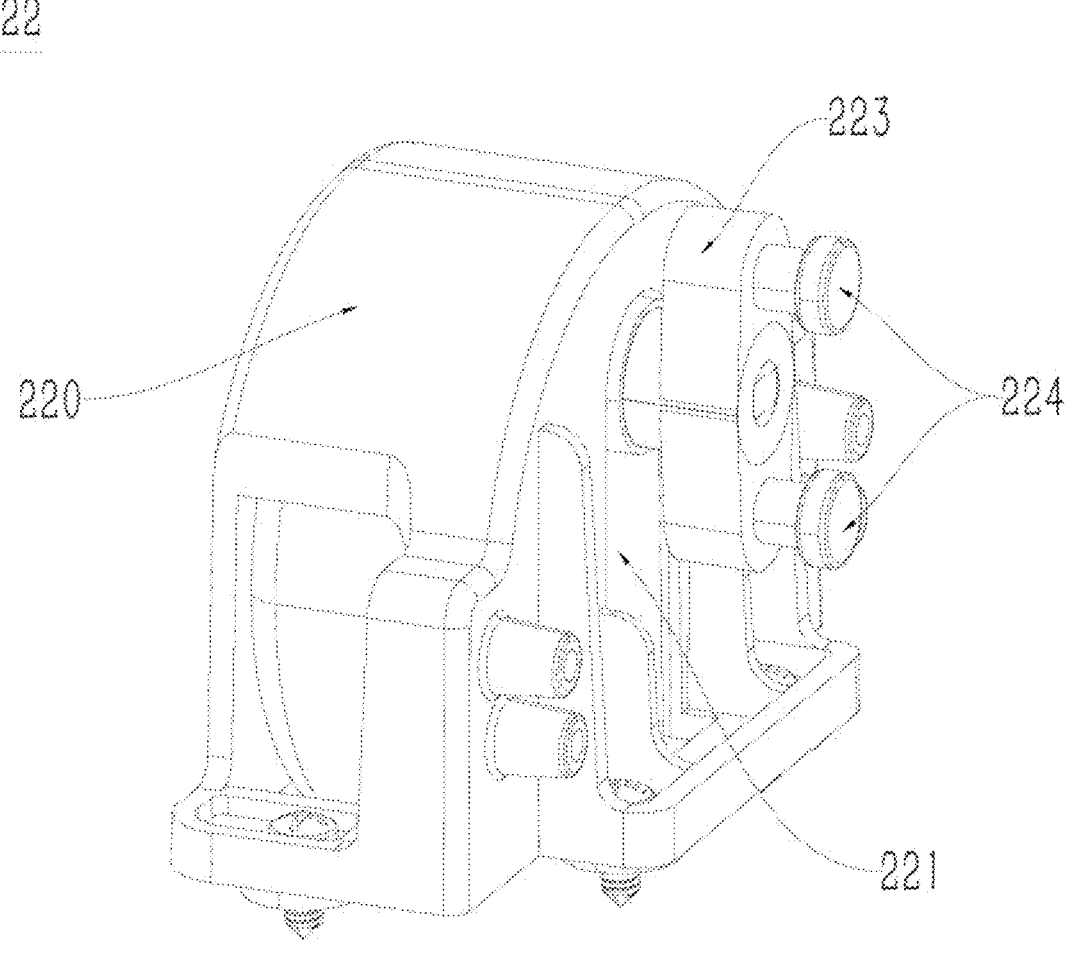
FIG. 7 is a schematic view of a driving component of the automatic egg turning device for incubator.
Figure 8:
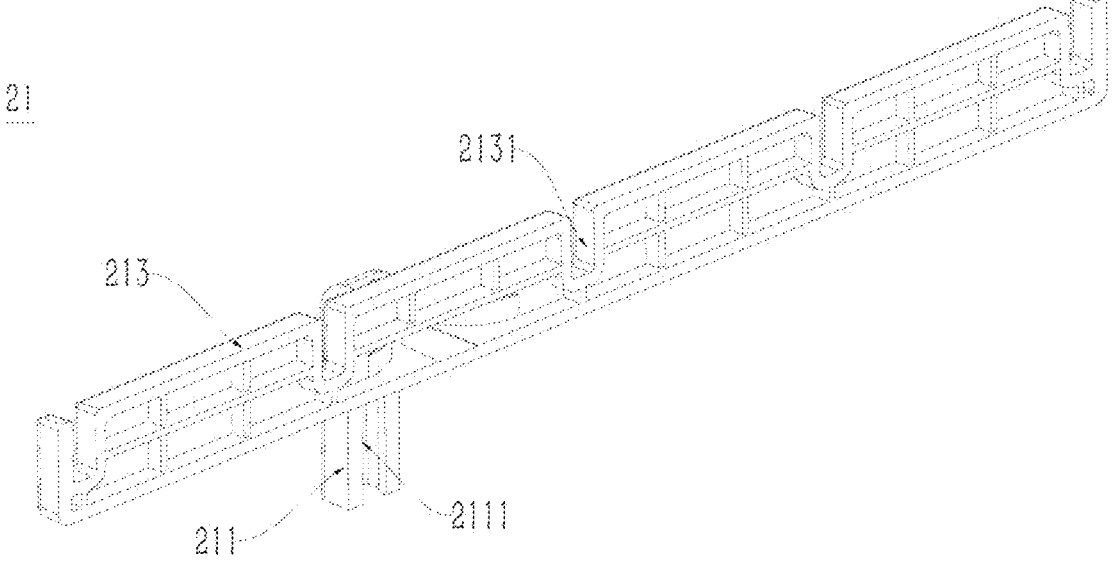
FIG. 8 is a schematic view of a linkage bracket in the automatic egg turning device for incubator.

With reference to FIGS. 1 to 8, the automatic egg turning device for incubator comprises a base 1 and a turning assembly; the turning assembly is installed on the base 1; the turning assembly comprises an egg tray, a linkage bracket and a driving component; the egg tray is connected to the linkage bracket; the driving component is used to drive the linkage bracket to move; and the linkage bracket drives the egg tray to move; eggs in the egg tray are automatically turned over during movements of the egg tray; with the help of the automatic egg turning device for incubator, producers no longer need to employ workers to manually turn eggs during a hatching process, and then it help to save labor cost and time cost at the same time; moreover, no one opens the automatic egg turning device for incubator during the hatching process, thereby reducing risks of bacterial contamination on eggs and ensuring a high success rate of incubation.

The turning assembly comprises an egg tray 20, a linkage bracket 21 and a driving component 22; the egg tray 20 is used to hold a plurality of eggs and the egg tray 20 is connected to the linkage bracket 21; the driving assembly 22 is used to drive the linkage bracket 21 to move; and the linkage bracket 21 drives the egg tray 20 to move; the eggs in the egg tray 20 are automatically turned over following with the movements of the egg tray 20; because the movements of the egg tray 20 are regular and stable, the eggs in the egg tray are hatched uniformly, and the success rate of incubation is increased.

Furthermore, the egg tray 20 is provided with a plurality of through holes 200, and the plurality of through holes 200 accelerate air circulation in side the incubator.

The base 1 is provided with a support column 16, a top of the support column 16 is provided with a first clamping groove 161, the linkage bracket 21 is partially inserted into the first clamping groove 161, and the support column 16 is used to support the linkage bracket 21.

Specifically, the driving component 22 comprises a motor 221 and an eccentric cam 223; the eccentric cam 223 is connected with an output end of the motor 221; the linkage bracket 21 comprises a sliding rod 211 extending towards a vertical direction; the sliding rod 211 is provided with a sliding groove 2111 extending towards the vertical direction, one end of the eccentric cam 223 far away from the motor 221 is provided with a plurality of connecting rods 224; and the plurality of connecting rods 224 are limited moving along the sliding groove 2111.

It can be understood that the motor 221 rotates, then the eccentric cam 223 will be rotated following. Due to the connecting rod 224 is limited in the sliding groove 2111, in other words, the connecting rod 224 only allows to slide in the vertical direction along the sliding groove 2111. The connecting rod 224 slides to a side wall of the sliding groove 2111, which generates a frictional force, which leads the linkage bracket 21 to move along a horizontal direction of the base 1, and the linkage bracket 21 drives the egg tray 20 to move from right to left along the horizontal direction of the base 1, the eggs in the egg tray are automatically turned over following with the movements of egg tray 20.

When the motor 221 rotates in a forward direction, the connecting rod 224 slides upward along the sliding groove 2111, and the linkage bracket 21 moves toward one side along the horizontal direction of the base 1; When the motor 221 rotates in a backward direction, the connecting rod 224 slides downward along the sliding groove 2111, and the linkage bracket 21 moves toward an other side along the horizontal direction of the base 1. That is to say, when the motor 221 *rotates* forward and backward alternately, the linkage bracket 21 follows to move from right to left along the horizontal direction of the base 1, and then the linkage bracket 21 drives the egg tray 20 to move, the eggs in the egg tray are automatically turned over following with the movements of egg tray 20.

Preferably, an end of the base 1 is provided with a motor mounting groove 10; a motor fixing seat 220 is arranged in the motor mounting groove 10; and the motor 221 is installed on the motor fixing seat 220.

Preferably, the base 1 is provided with a wire pressing structure 222, wherein the wire pressing structure 222 comprises a first wire pressing structure 2221 and a second wire pressing structure 2222 which are arranged on an outer surface of the base 1. The wire pressing structure 222 is used to store electrical wires that connects the motor 221 with a power source; thanks to the wire pressing structure 222, it holds the electrical wires in a uniform state.

Preferably, the linkage bracket 21 further comprises a connecting component 212 and a first support rod 213; the first support rod 213 extends along the horizontal direction of the base 1; the first support rod 213 is connected to the sliding rod 211 through the connecting component 212; a plurality of second clamping grooves 2131 are uniformly distributed on the first support rod 213 at intervals; an end of the egg tray 20 is provided with a first clamping block 201 matched with one of the plurality of second clamping grooves 2131; in this embodiment, a plurality of egg trays 20 are provided; the plurality of the egg trays 20 share a same quantities with that of the plurality of second clamping grooves 2131.

By inserting the first clamping block 201 of each of the plurality of egg trays 20 into the plurality of second clamping grooves 2131 respectively, the plurality of egg trays 20 are installed and linked with the linkage bracket 21; when the linkage bracket 21 moves, the plurality of egg trays 20 follow to move.

Preferably, two ends of the base 1 are provided with a plurality of second support rods 11; a top end of each of the plurality of second support rods 11 is respectively provided with a third clamping grooves 111; two ends of the each of the plurality of egg trays 20 is respectively provided with a second clamping block 202, the clamping block 202 fits to insert into the third clamping groove 111.

The first clamping block 201 covers the second clamping block 202; a vertical height of the plurality of second support rods 11 is lower than that of the first support rod 213.

It can be understood that the first support rod 213 and the plurality of second support rod 11 support the plurality of egg trays 20; the first support rod 213 is linked with the linkage bracket 21; once the motor 221 works, the linkage bracket 21 moves from right to left along the horizontal direction of the base 1; the linkage bracket 21 drives the plurality of egg trays 20 to move from right to left along horizontal direction of the base 1; the plurality of second support rods 11 are fixedly arranged on the base 1; the plurality of second support rods 11 support the plurality of egg trays 20. The second clamping block 202 of the each of the plurality of egg trays 20 is inserted into the third clamping groove 111; the second clamping block 202 plays a role as a shaft; when the linkage bracket 21 drives the first support rod 213 to move from right to left along the horizontal direction of the base 1, the first support rod 213 drives the plurality of egg trays 20 to move accordingly; however, because the second clamping block 202 is fixedly connected with the each of the plurality egg trays 20, and the second clamping block 202 is limited in the third clamping groove 111; then the plurality egg trays 20 rotate around the second clamping block 202 and move from right to left along the horizontal direction of the base 1 at the same. In other words, the plurality egg trays 20 not just simply move from right to left but also rotate around the second clamping block 202, in this way, the eggs in the plurality egg trays will be turned over to a great extend.

Preferably, the base 1 is provided with a mounting rack 12; a top end of the mounting rack 12 is provided with a pressing block 121; and the pressing block 121 covers the first support rod 213.

Further, the base 1 is provided with two mounting racks 12; the two mounting racks 12 press on the two ends of the first support rod 213, which ensures that the first support rod 213 moves horizontally only without moving upward.

Preferably, in this embodiment, the bottom of the base 1 is provided with a convex platform 13; a concave part 131 is arranged on a center position of the convex platform 13; one side of the convex platform 13 is provided with a notch 132; the base 1 is provided with a water inlet groove 14 extending to the outside of the base 1; and the water inlet groove 14 communicates with the concave part 131 through the notch 132.

Generally, it requires a suitable humidity condition for a incubation of eggs, especially during later stage of the incubation; the eggs needs stay in an environment with more moisture when chicks break their way out into the world. The user can add water into the concave part 131 through the water inlet groove 14 to increase a moisture degree inside the incubator. A suitable moister degree of the environment helps each egg hatchs successfully; with a help of the incubator provided in this embodiment, it ensures a high success rate of incubation.

Preferably, the automatic egg turning device further comprises a support disk 15; the support disk 15 is of a mesh structure; and the support disk 15 is installed on the convex platform 13.

Once the eggs break their way out into the world, the support disk 15 becomes a perfect activity space for them to go around; at the same time, it is convenient for the user to observe a living state and environment of their chicks; in addition, feces and other wastes will fall down from the support disk 15 through the mesh structure, so the support disk 15 remains in a clean condition.

The above only aims to illustrate the technical solution of the present application without limitation. Any other modifications or equivalent replacements of the technical solution of the present application made by ordinary skilled in the art should be included in the scope of the claims of the present utility patent as long as they do not deviate from the technical solution spirit and scope of the present application.

The invention claimed is:

1. An automatic egg turning device for incubator, comprises a base and a turning assembly arranged in the base, wherein the turning assembly comprises an egg tray, a linkage bracket and a driving component; the egg tray is used to hold a plurality of eggs and is connected to the linkage bracket; the driving component is used to drive the linkage bracket to move; and the linkage bracket drives the egg tray to move in the base-; the driving component comprises a motor and an eccentric cam connected to an output end of the motor; the linkage bracket comprises a sliding rod extending in a vertical direction; the sliding rod is provided with a sliding groove extending in the vertical direction; one end of the eccentric cam far away from the motor is provided with a plurality of connecting rods, and the plurality of connecting rods are limited moving along the sliding groove.

2. The automatic egg turning device for incubator according to claim 1, wherein the linkage bracket further comprises a connecting component and a first support rod; the first support rod extends in a horizontal direction and is connected with the sliding rod through the connecting component.

3. The automatic egg turning device for incubator according to claim 2, wherein an end of the base is provided with a mounting rack; a top of the mounting rack is provided with a pressing block, and the pressing block covers the first support rod.

4. The automatic egg turning device for incubator according to claim 2, wherein a plurality of second clamping grooves are uniformly distributed on the first support rod at intervals; an end part of the egg tray is provided with a first clamping block matched with one of the plurality of second clamping grooves; and multiple egg trays are provided and the number is the same as that of the plurality of second clamping grooves.

5. The automatic egg turning device for incubator according to claim 4, wherein two ends of the base are provided with a plurality of second support rods; a top end of each of the plurality of second support rods is provided with a third clamping grooves; and two ends of the egg tray are respectively provided with a second clamping blocks matched with the third clamping groove.

6. The automatic egg turning device for incubator according to claim 1, wherein a bottom of the base is provided with a convex platform; a middle of the convex platform is provided with a concave part, one side of the platform is provided with a notch; the base is provided with a water inlet groove extending to an outside of the base; and the water inlet groove is communicated with the concave part through the notch.

7. The automatic egg turning device for incubator according to claim 6, further comprising a support disk; the support disk is of a mesh structure and is arranged on the convex platform.

8. The automatic egg turning device for incubator according to claim 1, wherein the end of the base is provided with a motor mounting groove; a motor fixing seat is arranged in the motor mounting groove; and the motor is arranged on the motor fixing seat.

9. The automatic egg turning device for incubator according to claim 1, wherein the base is provided with a wire pressing structure; the wire pressing structure comprises a first wire pressing structure and a second wire pressing structure which are arranged on an outer surface of the base.

* * * * *